US009059657B2

(12) United States Patent
Maekawa

(10) Patent No.: US 9,059,657 B2
(45) Date of Patent: Jun. 16, 2015

(54) MOTOR CONTROL DEVICE

(71) Applicant: Kabushiki Kaisha Toshiba, Minato-ku (JP)

(72) Inventor: Sari Maekawa, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 14/027,587

(22) Filed: Sep. 16, 2013

(65) Prior Publication Data

US 2014/0225543 A1 Aug. 14, 2014

(30) Foreign Application Priority Data

Feb. 13, 2013 (JP) ................................ 2013-025531

(51) Int. Cl.

*H02P 1/04* (2006.01)
*H02P 23/00* (2006.01)
*H02P 27/08* (2006.01)

(52) U.S. Cl.

CPC .................................... *H02P 27/085* (2013.01)

(58) Field of Classification Search

USPC ................................ 318/400.01, 400.17, 700
See application file for complete search history.

(56) References Cited

U.S. PATENT DOCUMENTS

2005/0047762 A1* 3/2005 Liu et al. ........................ 388/806
2007/0103950 A1* 5/2007 Arisawa et al. ............... 363/132
2007/0296371 A1* 12/2007 Aoki ............................ 318/700
2008/0061726 A1* 3/2008 Iwaji et al. ..................... 318/723
2009/0243526 A1* 10/2009 Ito et al. .................. 318/400.34
2012/0074888 A1 3/2012 Maekawa
2013/0069572 A1* 3/2013 Maekawa ................ 318/400.14
2014/0292241 A1* 10/2014 Maekawa ................ 318/400.17

FOREIGN PATENT DOCUMENTS

JP 3447366 7/2003
JP 2012-70591 4/2012
JP 2012-070591 A 4/2012

* cited by examiner

*Primary Examiner* — Kawing Chan
(74) *Attorney, Agent, or Firm* — Oblon, McClelland, Maier & Neustadt, L.L.P.

(57) ABSTRACT

A motor control device includes a PWM signal generation unit configured to increase/decrease duty in both leading and lagging directions regarding a phase in which the duty becomes maximum among three-phase PWM signals. The unit is also configured to increase/decrease the duty in one of leading and lagging directions regarding a phase in which the duty becomes minimum. Regarding a phase in which duty is intermediate between the phases, the unit is configured to increase/decrease duty in the other of the leading and lagging directions based on the phase, thereby generating a three-phase PWM signal pattern so that a current detection unit is capable of detecting two-phase currents at two time-points fixed within a carrier period of the PWM signal respectively. A duty compensation unit is configured to increase/decrease before and after changing an increasing/decreasing direction of three-phase duties, increasing/decreasing the duties to compensate for the duties.

3 Claims, 16 Drawing Sheets

| U-PHASE Hi-SIDE FET | V-PHASE Hi-SIDE FET | W-PHASE Hi-SIDE FET | MOTOR CURRENT DETECTED IN ONE SHUNT |
|---|---|---|---|
| ON | OFF | OFF | +Iu |
| ON | ON | OFF | -Iw |
| OFF | ON | OFF | +Iv |
| OFF | ON | ON | -Iu |
| OFF | OFF | ON | +Iw |
| ON | OFF | ON | -Iv |
| OFF | OFF | OFF | UNDETECTABLE |
| ON | ON | ON | UNDETECTABLE |

FIG. 4

| VOLTAGE PHASE ANGLE | 0 | 30 | 60 | 90 | 120 | 150 | 180 | 210 | 240 | 270 | 300 | 330 |
|---|---|---|---|---|---|---|---|---|---|---|---|---|
| CENTRAL PHASE | U | U | U | U | W | W | W | W | V | V | V | V |
| LATTER HALF PHASE | V | V | V | V | V | V | V | V | W | W | W | W |
| FIRST HALF PHASE | W | W | W | W | U | U | U | U | U | U | U | U |

| VOLTAGE PHASE ANGLE | 0 | 30 | 60 | 90 | 120 | 150 | 180 | 210 | 240 | 270 | 300 | 330 |
|---|---|---|---|---|---|---|---|---|---|---|---|---|
| CENTRAL PHASE | U | U | U | U | W | W | W | W | V | V | V | V |
| LATTER HALF PHASE | W | W | W | W | U | U | U | U | U | U | U | U |
| FIRST HALF PHASE | V | V | V | V | V | V | V | V | W | W | W | W |

| VOLTAGE PHASE ANGLE | 0 | 30 | 60 | 90 | 120 | 150 | 180 | 210 | 240 | 270 | 300 | 330 |
|---|---|---|---|---|---|---|---|---|---|---|---|---|
| CENTRAL PHASE | U | U | U | U | W | W | W | W | V | V | V | V |
| LATTER HALF PHASE | V | V | V | V | V | V | V | V | W | W | W | W |
| FIRST HALF PHASE | W | W | W | W | U | U | U | U | U | U | U | U |

FIG. 8

CONVESION OF SET VALUE OF FIRST SECTION

| | |
|---|---|
| FIRST HALF PLACEMENT PHASE DUTY' | IF FIRST HALF PLACEMENT PHASE DUTY × 2<br>< MAXIMUM CARRIER VALUE<br>→ MAXIMUM CARRIER VALUE<br>OR ELASE<br>→ 2 × MAXIMUM CARRIER VALUE<br>-2 × FIRST HALF PLACEMENT PHASE DUTY |
| CENTER PLACEMENT PHASE' | CENTER PLACEMENT PHASE DUTY |
| LATTER HALF PLACEMENT PHASE DUTY' | IF LATTER HALF PLACEMENT PHASE DUTY × 2<br>< MAXIMUM CARRIER VALUE<br>→ 2 × LATTER HALF PLACEMENT PHASE DUTY<br>OR ELASE<br>→ MAXIMUM CARRIER VALUE |

FIG. 14A

CONVESION OF SET VALUE OF SECOND SECTION

| | |
|---|---|
| FIRST HALF PLACEMENT PHASE DUTY' | IF FIRST HALF PLACEMENT PHASE DUTY × 2<br>< MAXIMUM CARRIER VALUE<br>→ FIRST HALF PLACEMENT PHASE DUTY × 2<br>OR ELASE<br>→ MAXIMUM CARRIER VALUE |
| CENTER PLACEMENT PHASE' | CENTER PLACEMENT PHASE DUTY |
| LATTER HALF PLACEMENT PHASE DUTY' | IF LATTER HALF PLACEMENT PHASE DUTY × 2<br>< MAXIMUM CARRIER VALUE<br>→ MAXIMUM CARRIER VALUE<br>OR ELASE<br>→ 2 × MAXIMUM CARRIER VALUE<br>-2 × LATTER HALF PLACEMENT PHASE DUTY |

FIG. 14B

MOTOR CONTROL DEVICE

CROSS-REFERENCE TO RELATED APPLICATIONS

This application is based upon and claims the benefit of priority from the prior Japanese Patent Application No. 2013-025531 filed on Feb. 13, 2013, the entire contents of which are incorporated herein by reference.

FIELD

Embodiments described herein relate to a motor control device which detects a phase current by the use of a current detecting element disposed in a direct current part of an inverter circuit.

BACKGROUND

A current sensing technique is known in which phase currents are detected by a single shunt resistance inserted in a direct current part of an inverter circuit when U-phase, U-phase and W-phase currents are detected for the purpose of motor control. A three-phase PWM signal pattern needs to be generated so that two or more phase currents can be detected within one period of a pulse width modulation (PWM) carrier (a carrier wave), in order that all the three phase currents may be detected by the use of the aforementioned system. A first conventional technique reference proposes that PWM signal pulses of the respective phases be shifted for the purpose of reliable execution of current detection.

However, when the pulses are simply shifted, a motor current presents a stepwise variation in synchronization with transition from a pattern, resulting in a problem of increasing a level of noise produced during drive of an electric motor. In view of this problem, a second conventional technique reference discloses a technique for setting arrangement of PWM signals so that the pattern does not change, thereby improving a current detection rate and suppressing increases in current ripple and accompanying noise.

In the above-mentioned second reference, however, for the purpose of suppressing noise increase, an improvement in the current detection rate is partially limited in a region where a modulation factor is higher. A comparison will now be made among current detection rates obtained by respective PWM signal generation methods. A minimum pulse width τ [s] required for detection of DC current depends upon dead time, delay time of a current detection circuit and the like. Furthermore, a minimum duty $D_{min}$ [%] required for current detection is obtained from the minimum pulse width τ and a PWM period T [s] by equation (1):

$$D_{min}=2\tau/T\times100 \qquad (1)$$

When the modulation factor is defined as a ratio of an inverter line voltage amplitude to a DC power supply voltage and τ=10 [μs] and PWM period is set to 100 [μs], FIG. 15 shows current detection rates according to modulation factors of systems. The current detection rate is calculated as a rate of a section in which two or more phase currents are detectable in one period by electrical angle.

Although a general triangle-wave comparison modulation (♦) has a large number of sections where the modulation rate is low so that current cannot be detected, the above-described first reference (■) improves the phenomenon. On the other hand, in the reference (▲) rendering the fixed pulse placement of PWM signals variable or more particularly, in the above-described second reference, when a pulse placed in the center of carrier period is set to a phase indicative of maximum duty in three phases, the current detection rate is improved in the region where the modulation rate is high. However, this increases torque ripple, resulting in an increase in the drive noise of the motor.

BRIEF DESCRIPTION OF THE DRAWINGS

FIG. 4 shows motor current detected according to three-phase PWM pattern;

FIG. 8 shows a table of changing rules of pulse position;

FIGS. 14A and 14B show logics of duty conversion executed by the pulse generator in the second embodiment.

DETAILED DESCRIPTION

In general, according to one embodiment, a motor control device includes a current detecting element connected to a direct current side of an inverter circuit driving an electric motor and configured to generate a signal corresponding to a current value. A PWM signal generation unit is configured to determine a rotor position based on phase currents of the motor and to generate a three-phase PWM signal pattern so that the pattern follows the rotor position. A current detection unit is configured to detect the phase currents based on a signal generated by the current detecting element and the PWM signal pattern. A duty compensation unit is configured to compensate for a duty of the PWM signal pattern. The PWM signal generation unit is configured to increase/decrease the duty in both leading and lagging directions based on any phase of a carrier period regarding a phase in which duty becomes maximum among three-phase PWM signals. The PWM signal generation unit is configured to increase/decrease the duty to one of the leading and lagging sides based on any phase of the carrier period regarding a phase in which duty becomes minimum among three-phase PWM signals. Regarding a phase in which duty is intermediate between said two phases, the PWM signal generation unit is configured to increase/decrease duty in the other of the leading and lagging sides directions based on said any phase, thereby generating a three-phase PWM signal pattern so that the current detection unit is capable of detecting two-phase currents at two time-points fixed within the carrier period of the PWM signal. The duty compensation unit is configured to increase/decrease before and after changing an increasing/decreasing direction of three-phase duties, increasing/decreasing the duties thereby to compensate for the duties.

Figure 1:
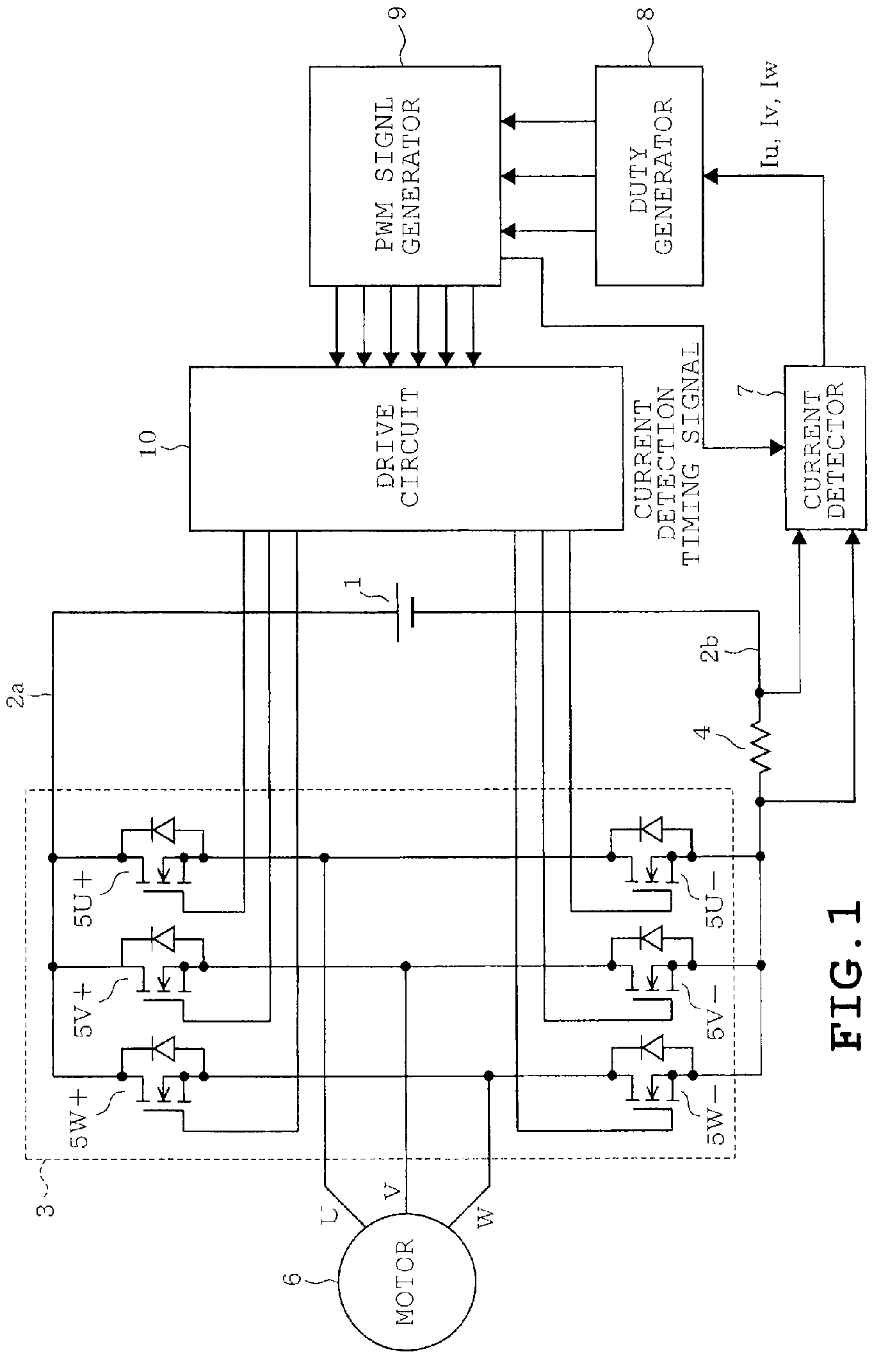
FIG. 1 is a functional block diagram showing an electrical arrangement of a motor control device according to a first embodiment.

A first embodiment will be described with reference to FIGS. 1 to 11. Referring to FIG. 1, an electrical arrangement of the motor control device according to the first embodiment is shown in the form of a functional block diagram. Although designated by a symbol of direct current supply, a direct current (DC) supply 1 may include a rectifier circuit, a capacitor and the like when DC supply is generated from a commercial alternate current (AC) supply. An inverter circuit (a DC/AC converter) 3 is connected via positive and negative bus bars 2*a* and 2*b* to the DC supply 1. A shunt resistance 4 serving as a current detecting element is inserted into the negative bus bar 2*b* side. The inverter circuit 3 comprises, for example, n-channel power MOSFETs 5 (U+, V+, W+, U−, V− and W−) connected into a three-phase bridge configuration. Phase output terminals are connected to phase windings of an electric motor 6 comprising a brushless DC motor, for example, respectively.

A terminal voltage (a signal corresponding to a current value) of the shunt resistance 4 is detected by a current detector 7. The current detector (a current detecting unit) 7 detects phase U, V and W currents $I_u$, $I_v$ and $I_w$ based on the terminal voltage and a three-phase PWM signal pattern supplied by the inverter circuit 3. When the phase currents detected by the current detector are supplied to a duty generator 8 to be A/D converted and read, computing is executed on the basis of control conditions of the motor 6 and the like. As a result, duties U_DUTY, V_DUTY and W_DUTY to generate three phase PWM signals are determined.

Figure 5:
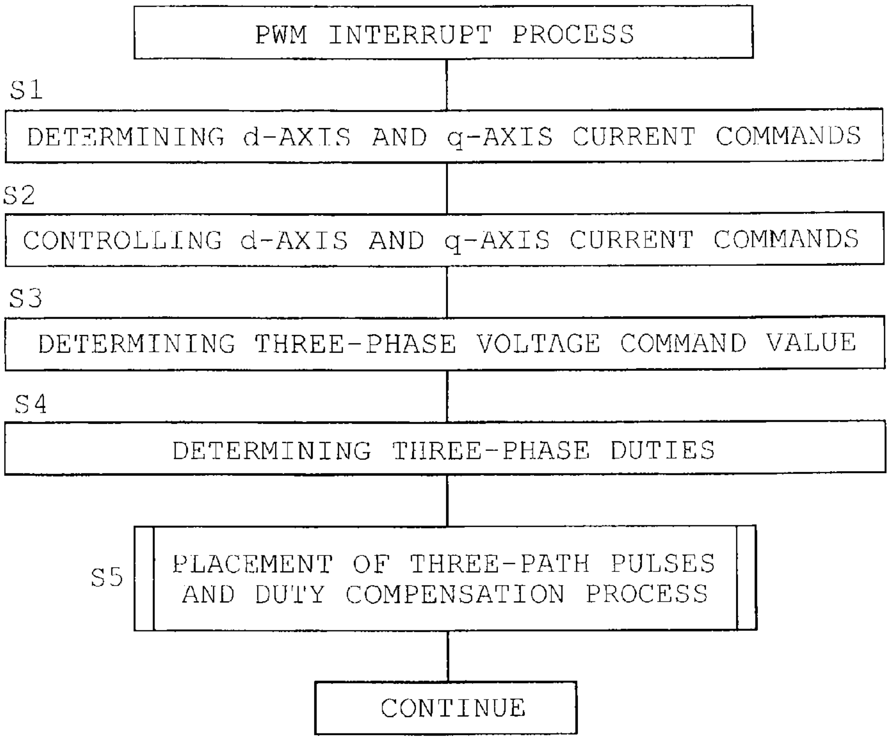
FIG. 5 is a flowchart showing interrupt processing executed every period of PWM carrier.

FIG. 5 is a flowchart showing interrupt processing executed every period of PWM carrier. In execution of a vector control, for example, a microcomputer setting a control condition or the like supplies a rotational speed command $\omega_{ref}$ of an electric motor 6 to a duty generator 8. The duty generator 8 then generates a torque current command $I_{qref}$ based on the difference between a rotational speed command $\omega_{ref}$ of the motor 6 and an actual rotational speed of the motor 6 estimated (S1). Furthermore, the polarity and value of a d-axis current command value are determined depending upon which one of "full field operation (=0)," "forced field operation (+)" and "weak-field operation" should be carried out.

A rotor position θ of the motor 6 is determined from three-phase currents $I_u$, $I_v$ and $I_w$. Then a torque current $I_q$ and an excitation current $I_d$ are calculated by a vector control calculation that uses the determined rotor position θ (S2). For example, a proportional-integral (PI) control calculation is executed with respect to the difference between the torque current command $I_{qref}$ and the torque current $I_q$, whereby a voltage command $V_q$ is generated. The same processing as described above is executed with respect to the excitation current $I_d$ side to generate a voltage command $V_d$. The voltage commands $V_q$ and $V_d$ are converted into three-phase voltages $V_u$, $V_v$ and $V_w$ with the use of the aforesaid rotor position θ (S3). Phase duties U_DUTY, V_DUTY and W_DUTY are determined on the basis of the three-phase voltages $V_u$, $V_v$ and $V_w$ respectively (S4). Three-phase pulse placement and duty compensation processing both to be executed at next step S5 will be described later.

The phase duties U_DUTY, V_DUTY and W_DUTY are then supplied to a PWM signal generator (a PWM signal generating unit) 9 which compares levels of the phase duties U_DUTY, V_DUTY and W_DUTY with the level of a carrier wave thereby to generate three-phase PWM signals, respectively. Furthermore, lower arm signals which are obtained by inverting the three-phase PWM signals are also generated and supplied to a drive circuit 10 after dead times have been added to the respective lower arm signals, if necessary. According to the supplied PWM signals, the drive circuit 10 supplies gate signals to gates of six power MOSFETs 5 (U+, V+, W+, U−, V− and W−) which constitute the inverter circuit 3. Regarding the upper arm of the inverter circuit 3, gate signals are supplied with respective potentials stepped up by necessary levels.

The following describes a manner that the PWM signal generator 9 generates three-phase PWM signals. When the inverter circuit 3 supplies pulse-width modulated three-phase alternate currents, current of a specified phase can be detected according to an energization pattern for the upper arm FETs 5 (U+, V+ and W+), as described above. Although the following describes phase upper arm gate signals, for example, voltages induced at both ends of the shunt resistance 4 correspond to a U-phase current in the period of an energization pattern in which only U phase is at a high-voltage level and both V- and W-phases are at low-voltage level. Furthermore, sign-inverted both end voltages of the shunt resistance 4 correspond to the W-phase current in the period of an energization pattern in which both U and V phases are at the high-voltage level and the W phase is at the low-voltage level (see FIG. 4).

Thus, when two-phase currents are in turn detected according to the energization pattern of PWM signals and data of the detected currents is stored, three-phase currents can be detected though time-multiplexed. In this case, error actually results from the above-described detecting manner since the phase currents are not detected simultaneously. However, an energization pattern for a subsequent period can be calculated without practical problems by solving a circuit equation using detected three-phase current values unless a special exactitude is required.

Furthermore, since the current waveforms are unstable immediately after changes in on/off states of the respective FETs 5, a minimum standby time (a stability time) τ is required in order that a voltage signal induced in the shunt resistance 4 may be read in a stable state (see the aforesaid second conventional technique in more detail). Furthermore, the system disclosed in the aforementioned second reference is basically employed in the embodiment, whereby output phases of the three-phase PWM signals are shifted according to duties of the respective phases.

Figure 2:
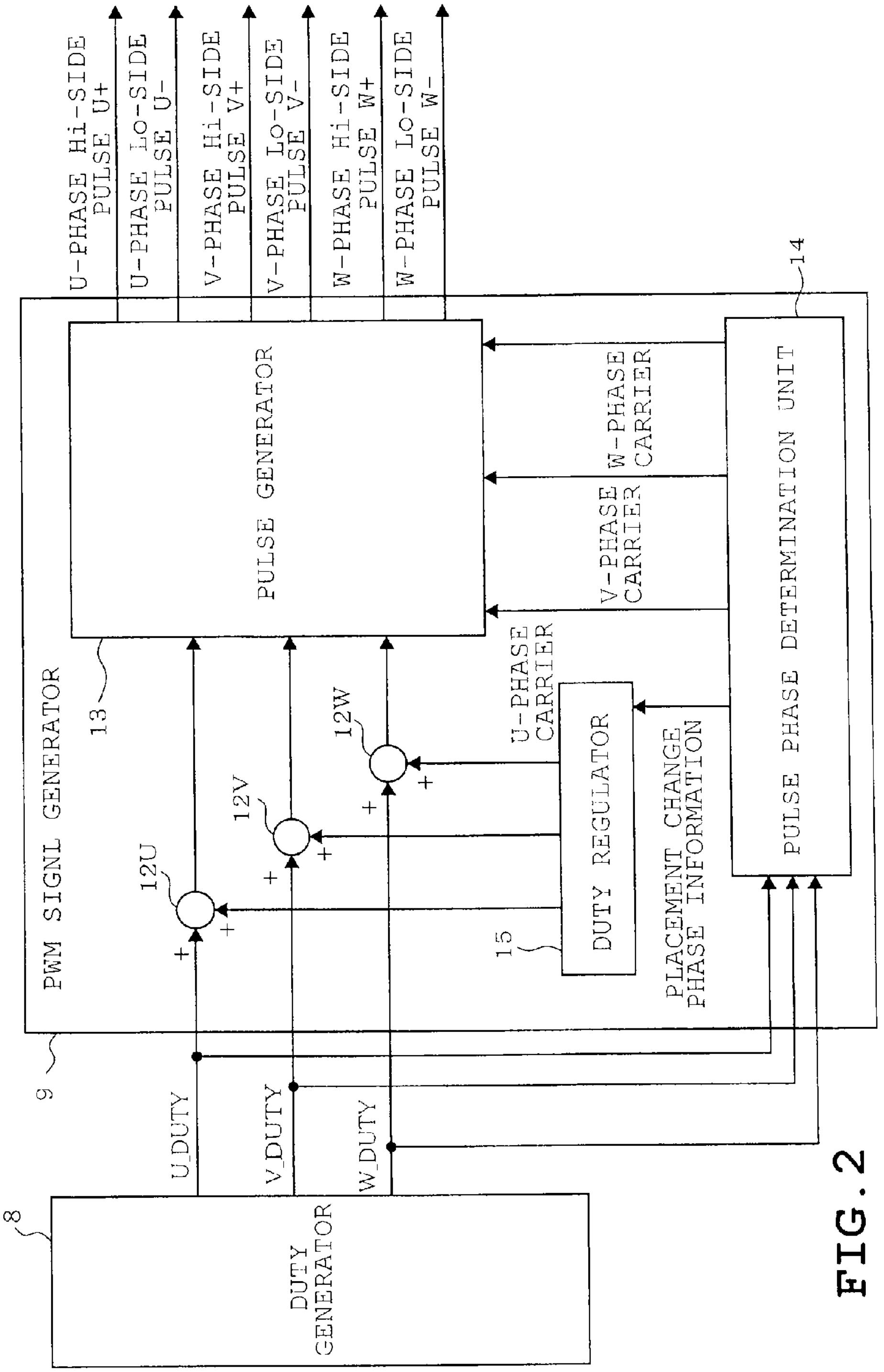
FIG. 2 is a functional block diagram showing an internal constitution of a PWM signal generator.
Figure 3:
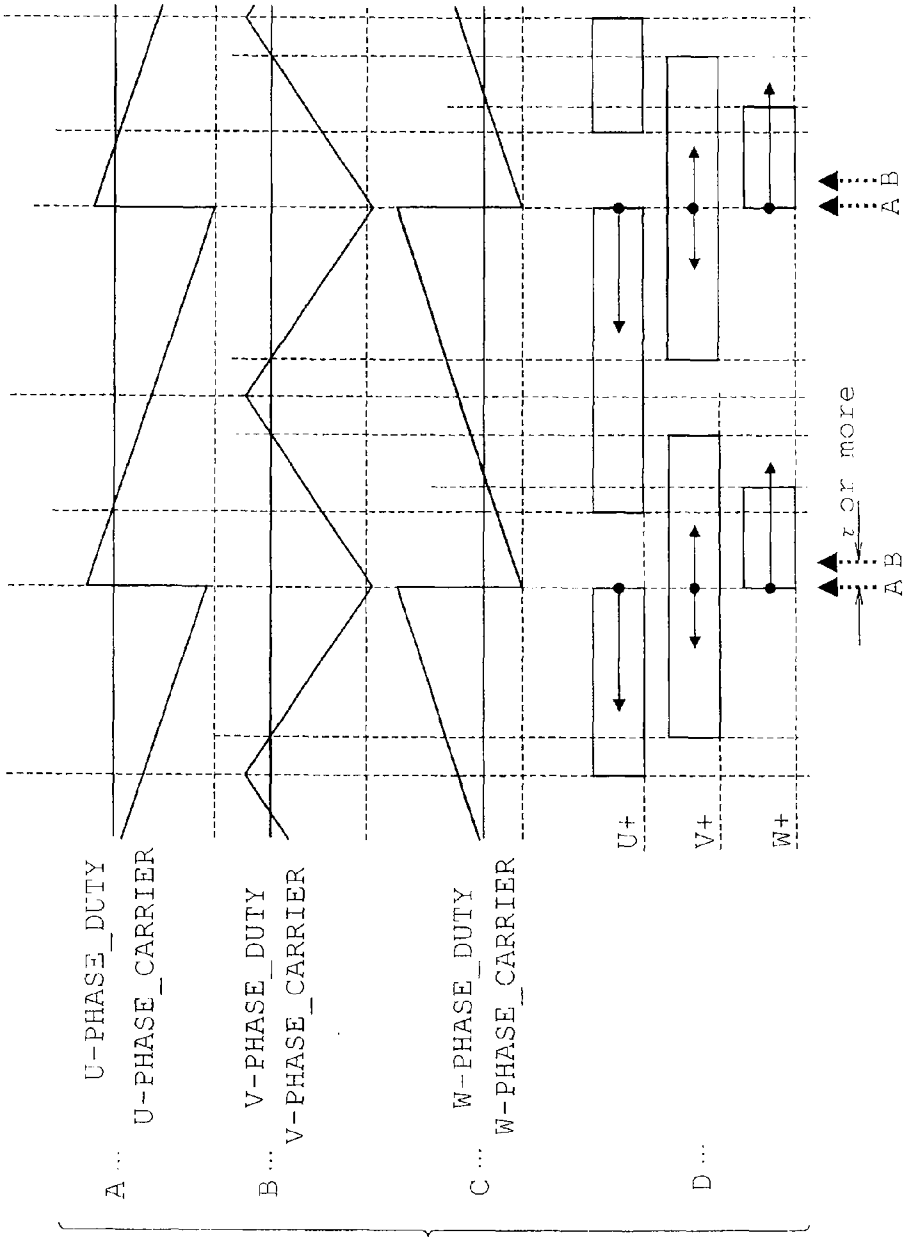
FIG. 3 is a timing diagram showing PWM carriers, duty commands of respective phases and the generation states of the respective phase PWM signal pulses.

FIG. 2 shows an internal constitution of the PWM signal generator 9. Parts A to C of FIG. 3 are timing charts showing the generation states of the respective three-phase PWM signal (U+, V+ and W+) pulses. These figures are similar to FIGS. 2 and 3A to 3C of the second reference.

FIG. 2 shows a pulse phase determination unit 14 and a duty regulator 15 disposed instead of the duty increase/decrease section 11. When regulation values are supplied by duty regulator 15 with respect to three-phase duties U_DUTY, V_DUTY and W_DUTY supplied from the duty generator 8, duties are added (or subtracted) via respective adders 12U, 12V and 12W. Output signals of the adders 12U, 12V and 12W are supplied to the pulse generator 13, which compares levels of the supplied output signals of the adders with the levels of the U-, V- and W-phase carriers (the carrier waves), whereupon three-phase PWM signals U±, V± and W± are generated.

Carriers selected and delivered by the pulse phase determination unit 14 are used for the pulse generator 13 and have different waveforms for every phase. For example, the U-phase carrier has a sawtooth waveform and the V-phase carrier has a triangular waveform as shown in Parts A and B, respectively, of FIG. 3. The W-phase carrier has a sawtooth waveform obtained by reversing the sawtooth waveform of the U-phase carrier as shown in Part C of FIG. 3. The pulse phase determination unit 14 switches the three phases as to which one of a triangular wave, a rising sawtooth wave and a falling sawtooth wave should be assigned to the three phases in the manner as will be described later. The carrier period is set to 100 microseconds, for example.

The pulse generator 13 compares duties U_DUTY, V_DUTY and W_DUTY with levels of the carriers respectively, thereby generating and supplying high-level pulses in a period when duty>carrier. As a result, as shown in Part D of FIG. 3, when a phase in which the amplitude of the V-phase carrier is minimum (a bottom of the triangular wave) is a reference wave, the pulse width of the U-phase PWM signal pulse U+ varies so as to be increased or decreased in the direction of phase lag (leftward in Part D of FIG. 3; and latter half) from the reference phase. The pulse width of the W-phase PWM signal pulse W+ varies so as to be increased or decreased in the direction of phase lead (rightward in Part D of FIG. 3; and first half) from the reference phase. The pulse width of the V-phase PWM signal pulse V+ varies so as to be increased and decreased in the directions of phase lag and phase lead (center) from the reference phase. The above-mentioned processing corresponds to “three-phase pulse placement” at step S5 in FIG. 5.

Furthermore, the pulse phase determination unit 14 supplies to the duty regulator 15 information indicative of which three types of waveforms have been assigned to as described above, that is, information about change in the placement of three-phase duty pulses. The duty regulator 15 regulates the duty pulse of the target phase so that the duty pulse is increased or decreased, based on the aforesaid placement change information.

Figure 6A:
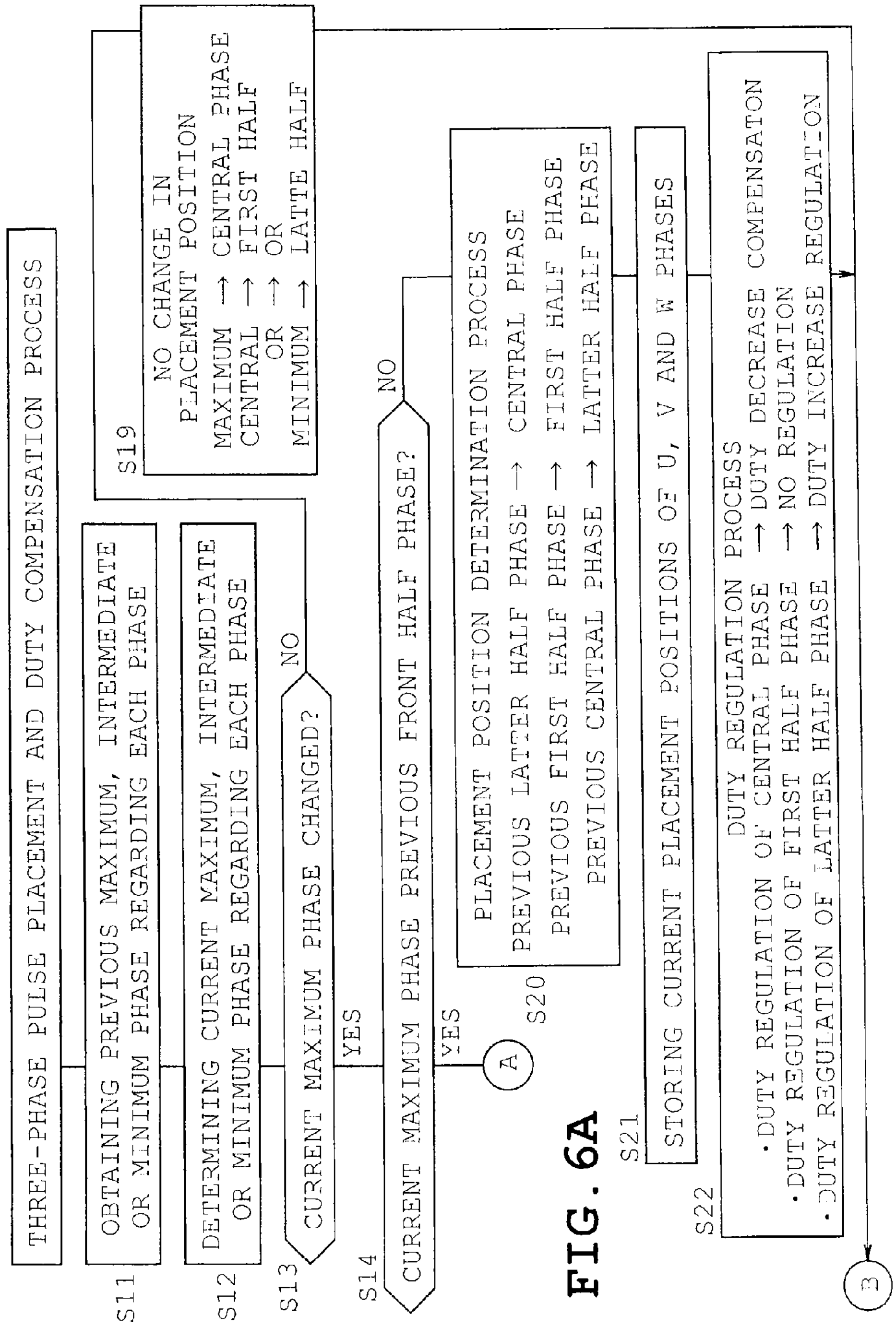
FIGS. 6A and 6B illustrate a flowchart showing processing carried out in a pulse phase determination section and a duty regulator.
Figure 6B:
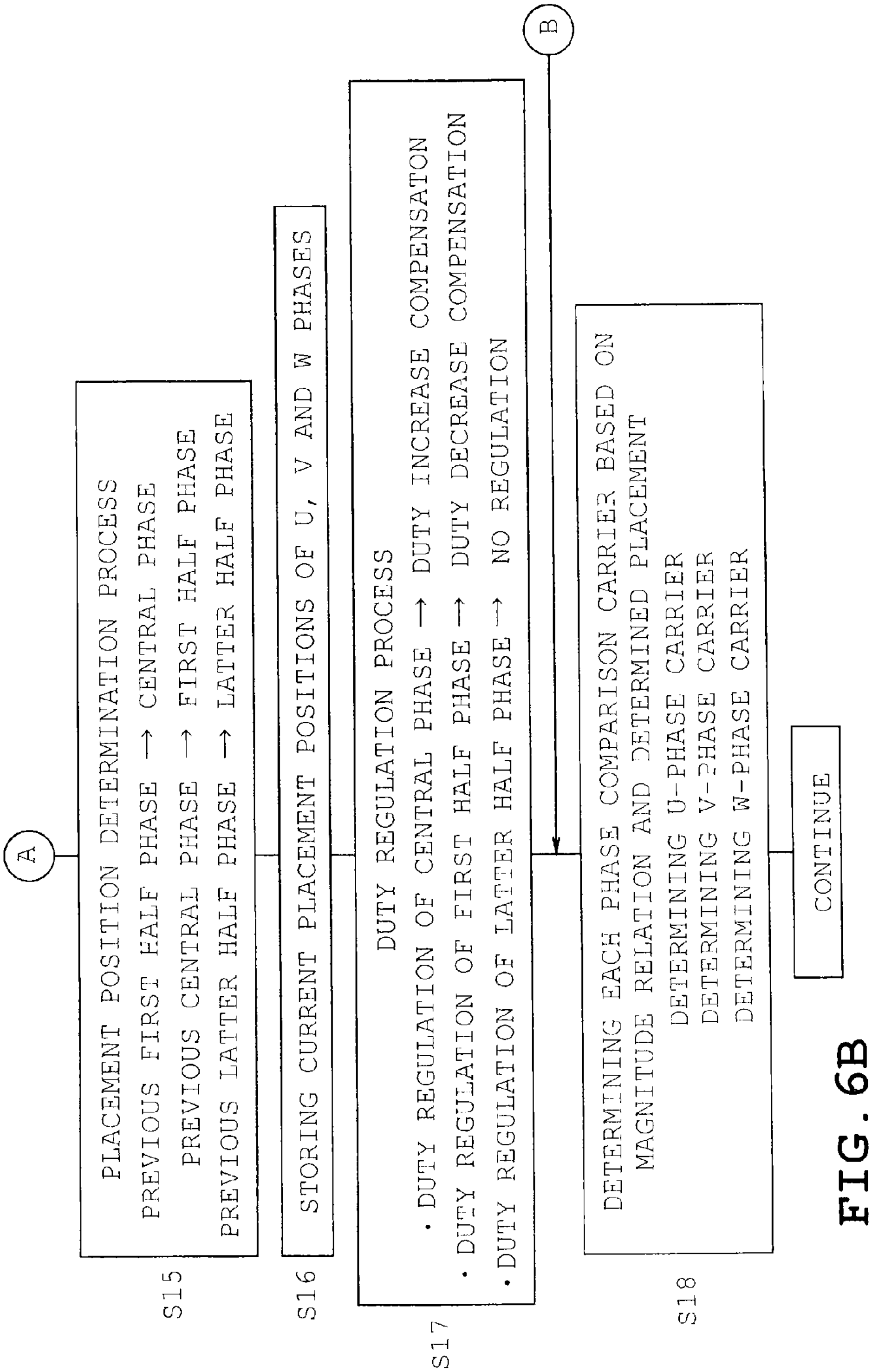

Next, a characteristic operation of the embodiment will be described with reference to FIGS. 6A to 11. FIGS. 6A and 6B illustrate a flowchart showing processing carried out by the pulse phase determination section and the duty regulator. When firstly obtaining maximum, intermediate and minimum values determined in the previous period and stored (S11), the pulse phase determination unit 14 evaluates a magnitude relation among three-phase duties U_DUTY, V_DUTY and W_DUTY in the current period, thereby determining the maximum, intermediate and minimum (S12).

At step S13, the pulse phase determination unit 14 compares the results of processing at steps S11 and S12 to determine whether or not the phase in which maximum duty is obtained has currently changed from the previous case. When the maximum phase has not been changed (NO), the previous three-phase pulse placement is used (no change; and step S19). More specifically, the phase in which the maximum duty is obtained is placed in the center, and the phase in which the intermediate or minimum duty is obtained is placed in the first or latter half. The carrier of the phase in which the maximum duty is obtained is set to a triangular wave, and the carrier of the phase in which the intermediate or minimum duty is obtained is set to a rising sawtooth wave or a falling sawtooth wave (S18). However, the following rule is applied when the maximum phase has been changed at step S13 and the pulse phase determination unit 14 determines in the affirmative (YES).

Figure 7:
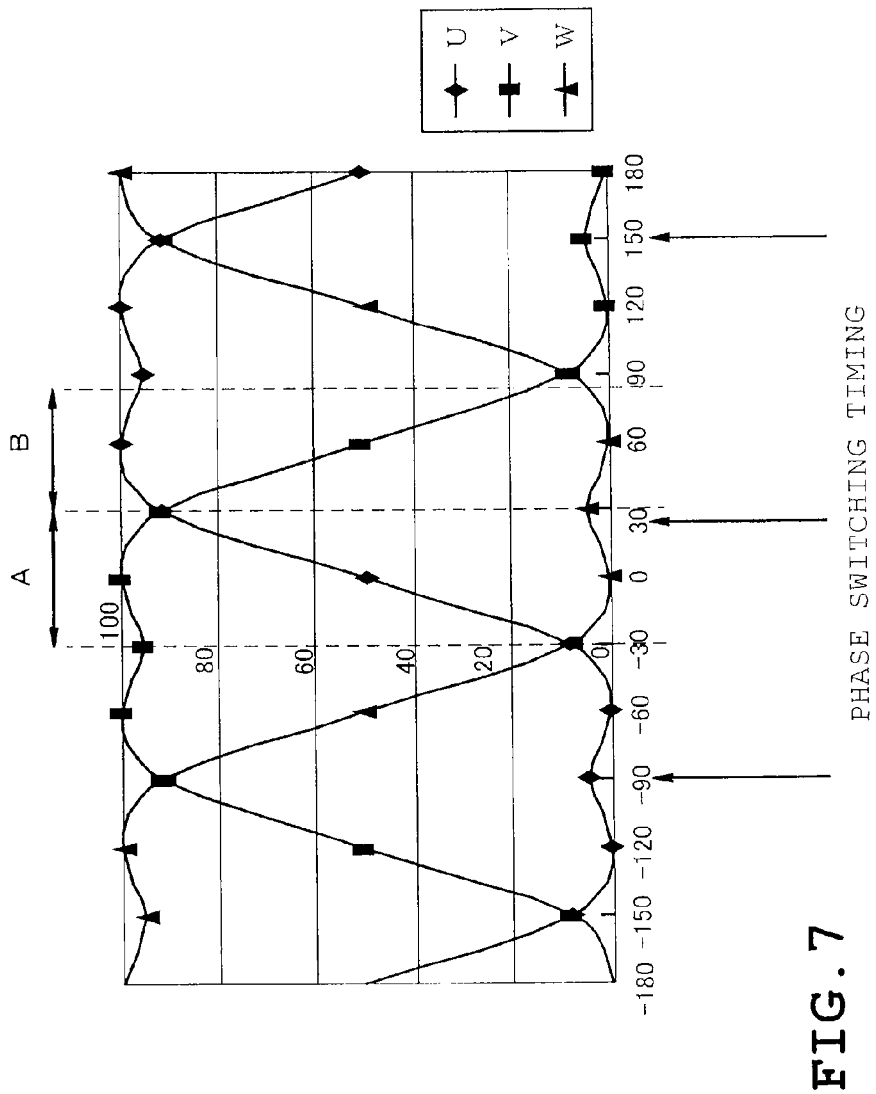
FIG. 7 shows timing when the magnitude relation of three-phase PWM duty changes.

Three-phase duties are generated according to a voltage phase angle in a manner as shown in FIG. 7 when three-phase modulated. Accordingly, the magnitude relation (maximum, intermediate and minimum) of the three-phase duties changes at six time-points. The phase in which the maximum duty is obtained changes at three time-points. For example, in the section A in FIG. 7, the magnitude relation among the three-phase duties, the carrier and generation positions of duty pulses are specified as follows:

Maximum phase→V phase (triangular wave) and pulse is placed in the center;

Intermediate phase→U phase (increasing sawtooth wave) and pulse is placed in latter half; and Minimum phase→W phase (falling sawtooth wave) and pulse is placed in first half.

When the phase angle proceeds to the location of section B, the magnitude relation of the three-phase duties is represented as the sequence of U, V and W phases. Accordingly, the U phase that is a maximum phase is compared with the triangular carrier, and regarding the V and W phases, the carrier waveform is changed so that an amount of change in the placement position is rendered smallest. For example, regarding the W phase, the carrier is the rising sawtooth wave in the section A in the transition from section A to section B in FIG. 7 and the pulse is placed in the first half placement. When the pulse switched from the first half placement to the latter half placement, the change is increased. Then, the pulse is also placed in the first half placement in the section B. On the other hand, regarding the V phase, the carrier is a triangular wave in the section A and the pulse is placed in the center. However, in the section B, the carrier is a rising sawtooth wave and the pulse is switched to the latter half placement.

FIG. 8 is a table of changing rules of placement position over an entire voltage phase angle. The phases in which the pulses are placed in the center, the first half and the latter half placements are switched, and synchronous switching is limited only to two phases. Furthermore, the change in the placement position is from the center to the first half placement or to the latter half placement and is limited to a PWM half period. This can suppress an increase in the current ripple and an increase in the noise by the change in the PWM placement position. Although FIG. 8 shows patterns of three electrical angle periods, the pattern changes range over two periods and returns to an initial pattern in a third period.

Steps S14, S15 and S20 in the flowchart of FIGS. 6A and 6B follow the aforesaid rules. At step S14, it is determined whether or not the current maximum phase is a previous first half phase. The control sequence proceeds to step S15 when it is determined in the affirmative. When it is determined in the negative, the control sequence proceeds to step S20. At step S15, the placement positions are determined in the following:

Previous first half phase→central phase
Previous central phase→first half phase
Previous latter half phase→latter half phase Furthermore, the placement positions are determined in the following at step S20:

Previous latter half phase→central phase
Previous first half phase→first half phase
Previous central phase→latter half phase The current placement positions of three-phase pulses are stored after execution of steps S15 and S20 (steps S16 and S17).

Figure 9:
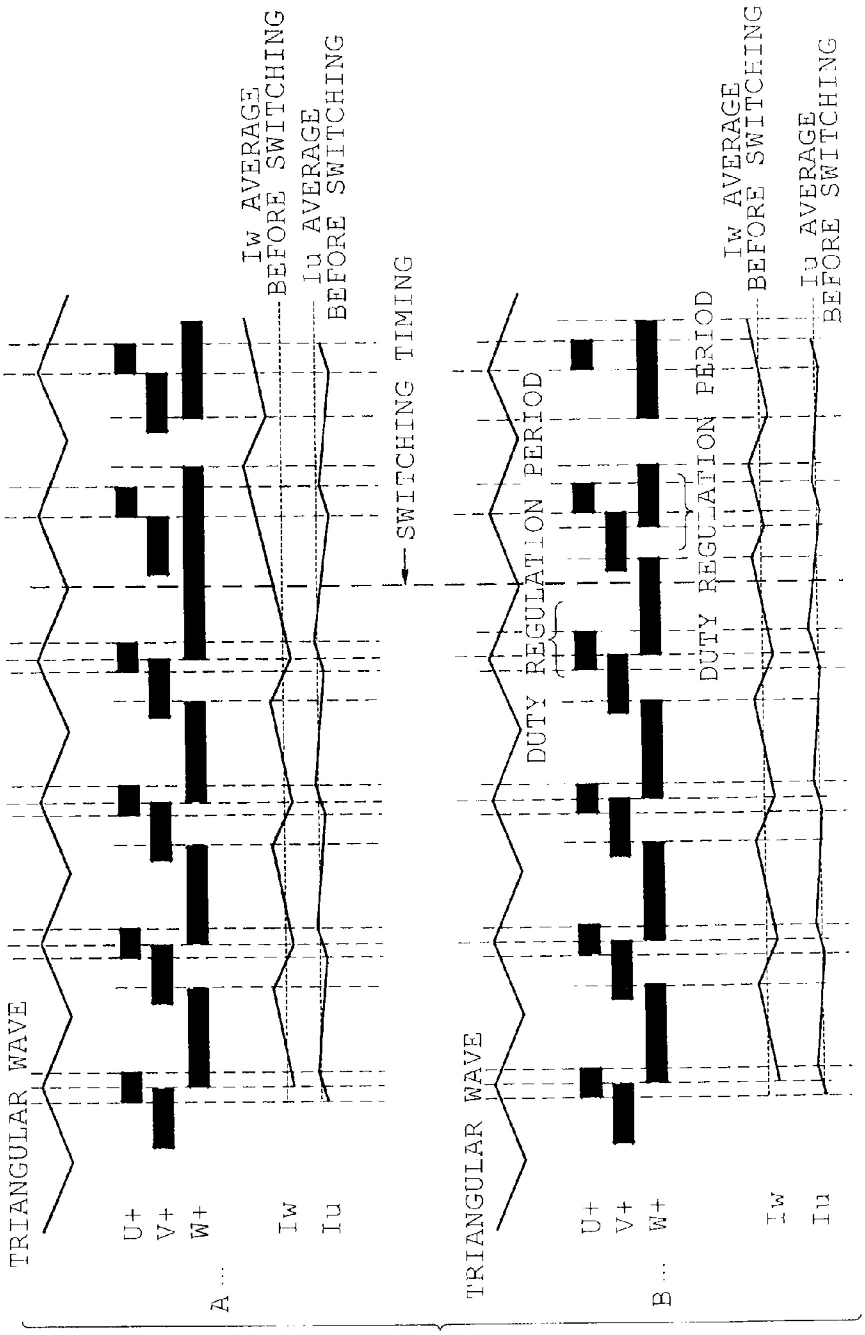
FIG. 9 explains the state where duty is increased/decreased before and after change in pulse position.

The following describes the duty regulator 15 which executes three-phase duty regulation with the change in the placement positions. Variations in applied three-phase voltages occur in a PWM period even when the placement positions of the three-phase pulses are changed as described above. Part A of FIG. 9 shows the three-phase pulses and the W-phase current in the case where the placement position of the W-phase has been changed from the latter half to the center. In this case, since the W-phase positive voltage application period is increased with change in the placement, the W-phase current causes ripple at the positive side in synchronization with the change in the placement.

The duty regulator 15 then regulates the three-phase duties by increasing or decreasing the three-phase duties according to the change in the placement, thereby suppressing the level of ripple. The pulse position changing rules of the pulse phase determination unit 14 forbids placement change from the first half of the pulse position to the second half or from the second half to the first half. In other words, the change in the pulse position is limited to a pattern from the center to the first or second half, or the reverse pattern. The duty regulating rules of the duty regulator 15 are specified as follows:

1. The duty is decreased regarding a phase in which a pulse generation position comes nearer as the result of change; and
2. The duty is increased regarding a phase in which a pulse generation position recedes as the result of change.

Strictly speaking, "a pulse generation position comes nearer" means that an interval between off-timing (falling) of the previous pulse and on-timing of the next pulse (rising) becomes shorter. "A pulse generation position recedes" means that an interval between on-timing and off-timing becomes longer.

A specific example shown in Parts A and B of FIG. 9 will be explained here. Since the W-phase pulse placement in Part A of FIG. 9 is changed from the latter half to the center before and after the switching, the W-phase pulse placement falls under the above-mentioned rule 1. More specifically, the pulse generation position comes nearer since the W-phase pulse placement is changed from the latter half to the center. Accordingly, the duty regulator 15 decreases the duty of the W-phase pulse as shown in Part B of FIG. 9. Furthermore, since the U-phase placement is changed from the center to the latter half, the U-phase pulse placement falls under the above-mentioned rule 2. Accordingly, the duty regulator 15 increases the duty of U-phase pulse before the switching as shown in Part B of FIG. 9. As a result, an amount of change in the amplitude before and after the switching are rendered smaller regarding each one of the U- and W-phase currents, whereupon ripple is suppressed, as shown in Part B of FIG. 9. This can suppress an increase in the drive noise of the motor 6.

A value that can experimentally reduce noise to a smallest level is desirable to be selected as an increase or decrease value to be regulated under the aforesaid rules by the duty regulator 15 while about a quarter of the duty before change is used as a guide in the case where the placement change is from the first half (or the latter half) to the center. For example, the value depends upon a set value of dead time.

Step S22 in FIG. 6A is a duty regulating process corresponding to the above-described case shown in FIG. 9. On the other hand, step S17 shows a case where the placement is changed as by step S15 and accordingly, the regulating rule 2 is applied to the current center phase while the regulating rule 1 is applied to the first half phase. No regulation is applied to the latter half phase.

When duty is regulated before execution of change in the pulse placement as in the U-phase pulse shown in Part B of FIG. 9, enough time is required for the duty regulation. For example, the following methods can be employed:

A. The duty switching period is set to 200 microseconds relative to the carrier period of 100 microseconds; and B. The switching of the duty is carried out at troughs of the carrier and the renewal of duty value is carried out at crests of the carrier.

Figure 10:
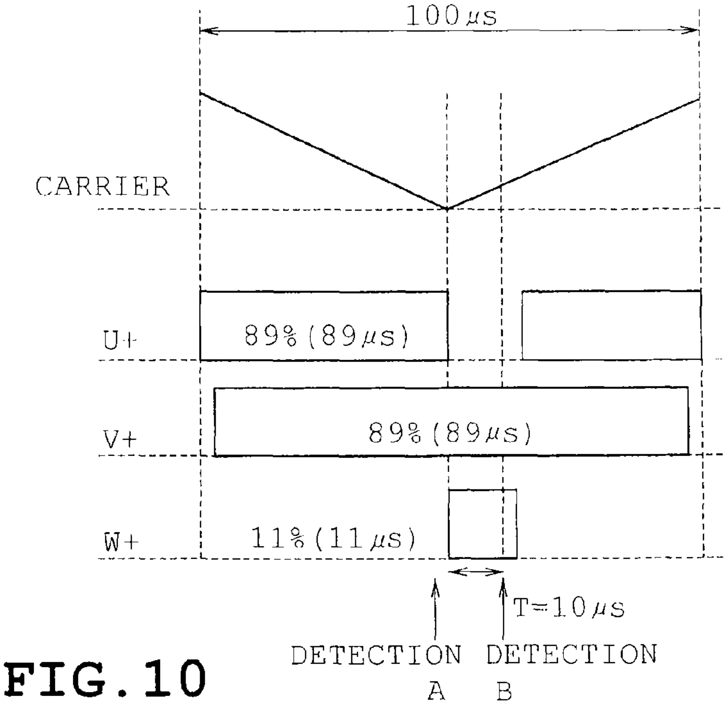
FIG. 10 is timing charts showing the generation states of the respective phase PWM signal pulses in the case where voltage applied to the motor is higher and an electrical angle is 300 degrees.
Figure 11:
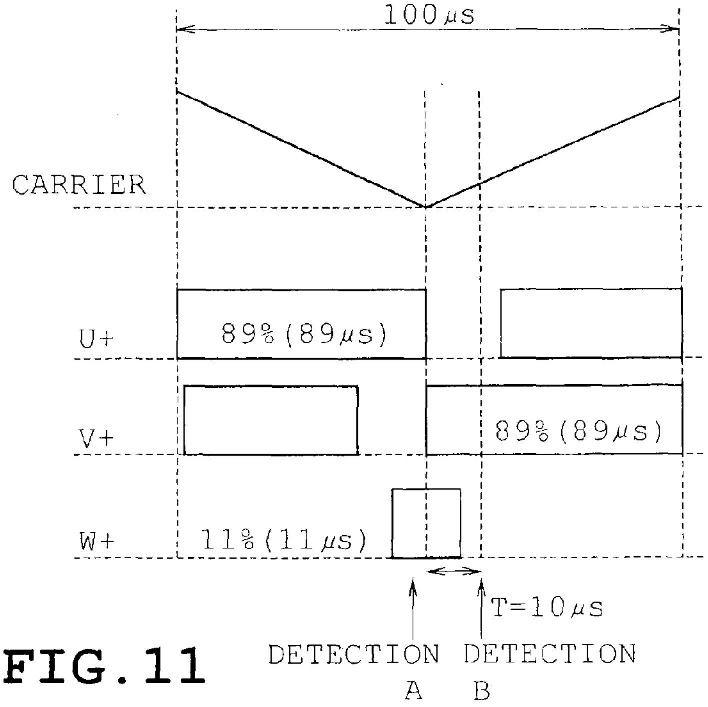
FIG. 11 is a view similar to FIG. 10, showing the case where W phase is assumed to be centrally placed.

Furthermore, FIG. 10 is a view similar to FIG. 9 of the second reference and shows a case where an electrical angle is at 300°, U-phase and V-phase duties are equally 89% and W-phase duty is 11%. In this case, regarding phase W, pulses are generated in a period from the bottom of the triangular wave to the vicinity of duty 11% in the direction of phase lag (rightward in Parts A and B of FIG. 9) in the PWM pattern as shown in Part B of FIG. 9. However, since the pulse width is 11 microseconds at duty 11% though the dead time $\tau$ is set to 10 microseconds, two-phase current can be detected by the use of the detection timings A and B. On the other hand, FIG. 11 shows the case where the W phase is placed in the center by the second conventional technique 2. In this case, a pulse extending by 5.5 microseconds to both sides from the bottom of the triangular wave is generated, whereupon the dead time $\tau$ becomes equal to or shorter than 10 microseconds with the result that two-phase currents cannot be detected. FIGS. 10 and 11 shows the first current detection timing A which is shifted to the leading side relative to that shown in FIG. 3 and the like in order that a phase actually serving as an object to be detected may be clarified.

In the above-described embodiment, when determining the rotor position based on the phase currents of the motor 6, the PWM signal generator 9 generates a three-phase PWM signal pattern so that the pattern follows the rotor position. The current detector 7 detects the phase currents $I_u$, $I_v$ and $I_w$ of the motor 6 based on the signal generated by the shunt resistor 4 connected to the DC side of the inverter circuit 3 and the PWM signal pattern. The PWM signal generator 9 increases/decreases the duty in both lagging and leading sides regarding the phase in which the duty becomes maximum, on the basis of any phase of the carrier period. The PWM signal generator 9 further increases/decreases the duty in a direction opposed to the foregoing one of lagging and leading sides regarding the phase in which the duty is intermediate between the foregoing two phases becomes minimum, on the basis of any phase of the carrier period.

As a result, the current detector 7 generates the three-phase PWM signal pattern so that two-phase currents are detectable at time-points fixed in the carrier period respectively. The duty regulator 15 then increases/decreases the duty before and after the switching that changes the direction in which the three-phase duties are increased/decreased thereby to compensate for the duty, regarding the duty of the PWM signal pattern.

More specifically, an object to be compensated for is the phase in which the direction in which duty is increased/decreased is switched from two directions to leading or lagging direction (from the central phase to the first half phase or the latter half phase) and a phase in which the direction in which duty is increased/decreased is switched from leading or lagging direction to two directions (from the first half phase or the latter half phase to the central phase). The post-switching duty is decreased regarding the phase in which on-timing of the post-switching duty pulse comes nearer to off-timing of the pre-switching duty pulse. The pre-switching duty is increased regarding the phase in which on-timing recedes off-timing. This can improve the current detection rate in the range from the low modulation factor to the high modulation factor while suppressing an increase in current ripple and motor drive noise due to the change in the pulse generation position.

Figure 12:
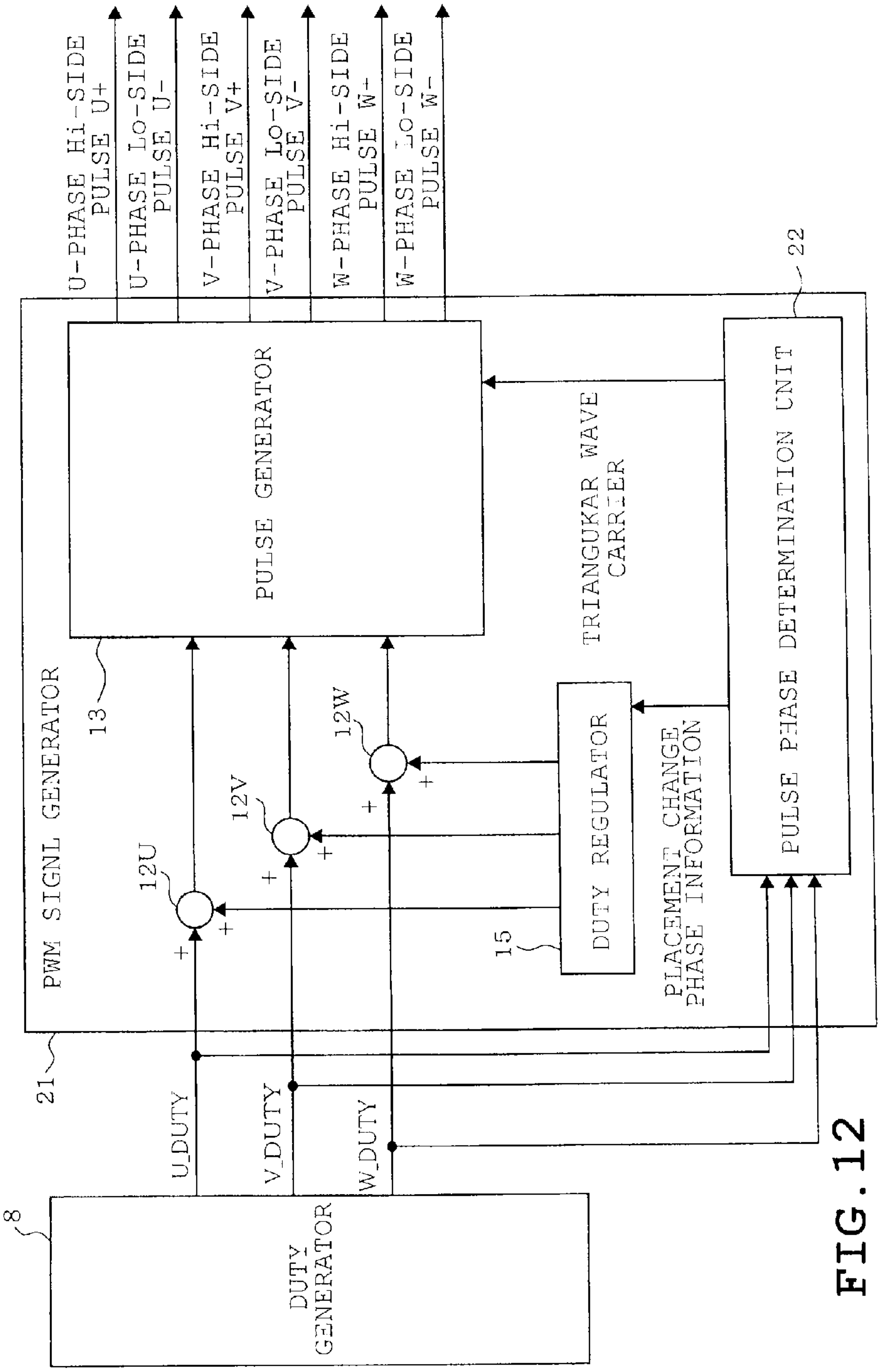
FIG. 12 is a view similar to FIG. 2, showing the motor control device according to a second embodiment.
Figure 13:
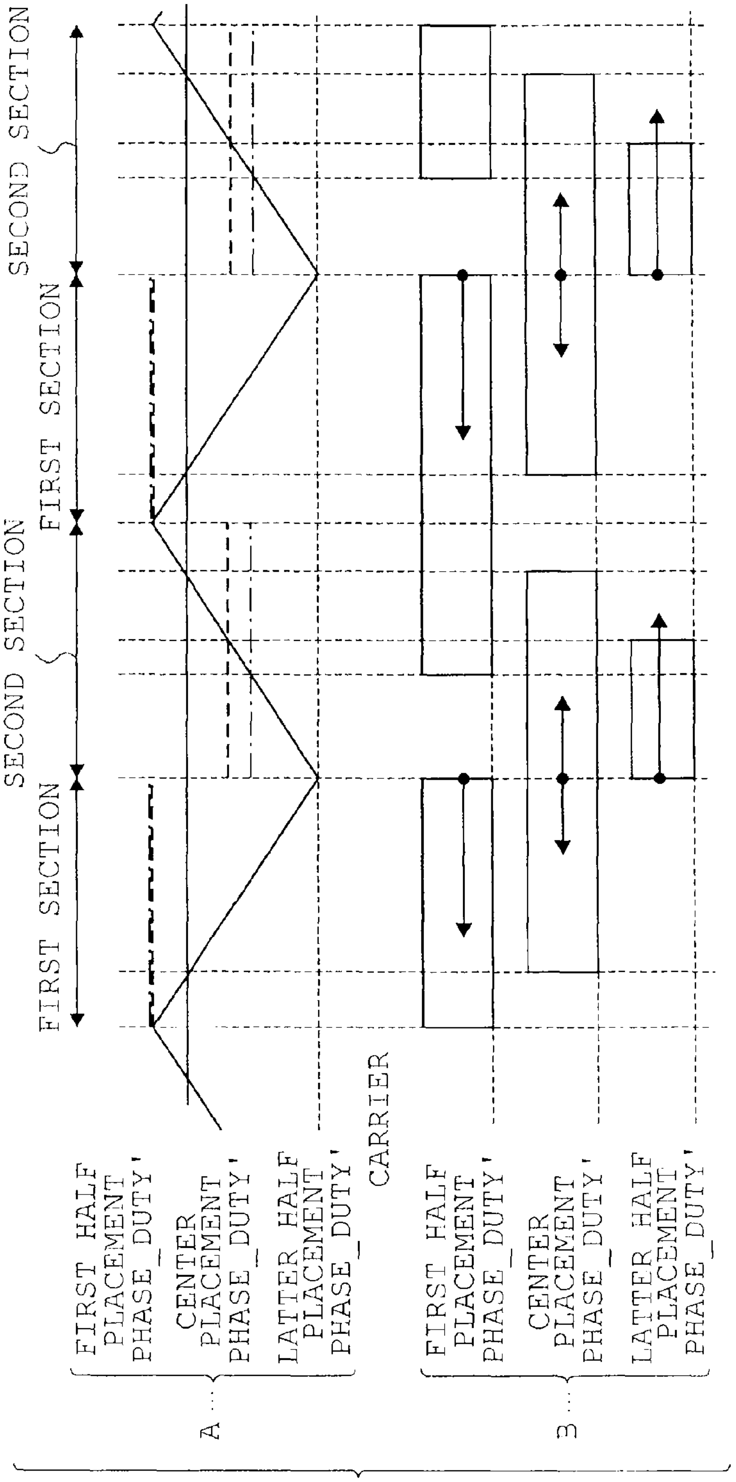
FIG. 13 is timing charts showing PWM carriers, duty commands of respective phases and the generation states of the respective phase PWM signal pulses in the second embodiment.
Figure 15:
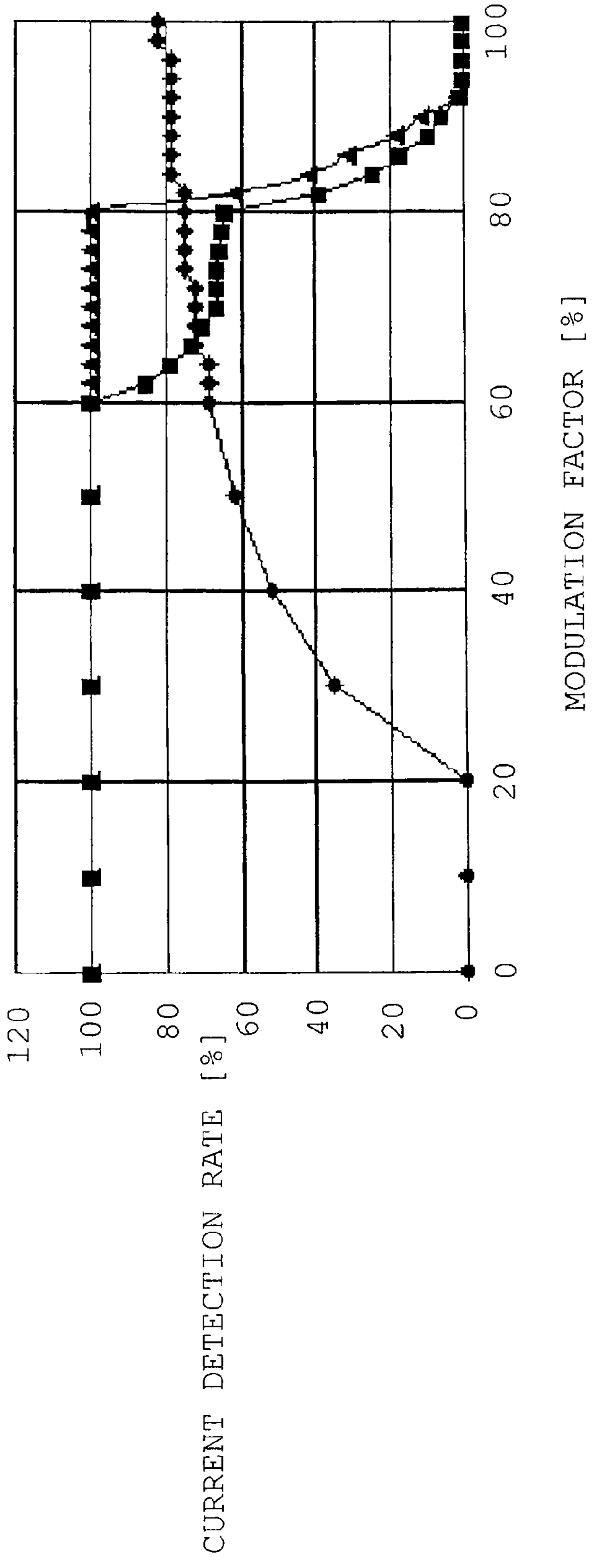
FIG. 15 explains the current detection rate in the conventional art.

FIGS. 12 to 14 illustrate a second embodiment. Identical or similar parts in the second embodiment are labeled by the same reference symbols as those in the second embodiment and detailed description of these parts will be eliminated. Only the differences between the first and second embodiments will be described in the following. FIG. 12 is a view similar to FIG. 2. The PWM signal generator 21 includes a pulse phase determining section 22 which is employed instead of the pulse phase determination unit 14 of the PWM signal generator 9. A fourth embodiment of the second reference is applied to the second embodiment. The pulse phase determining section 22 generates and supplies only the carrier of the triangular wave to the pulse generating section 13.

FIGS. 13, 14A and 14B correspond to FIGS. 16 and 17 of the second conventional technique respectively. FIGS. 13 to 14B show the first half placement phase, the central placement phase and the latter half placement phase regarding which the pulse placement positions are determined according to the magnitude of duties. Thus, the second embodiment can achieve the same advantageous effect as the first embodiment when the system in which the placement positions of the three-phase duty pulses are determined by the logic with use of only one type of carrier.

The time-points at which the current detector 7 detects two-phase currents within the carrier period may or may not be based on the phase indicative of the minimum or maximum carrier level. The time-points may be set on the basis of any phase of the carrier in a range in which two-phase currents are detectable.

Furthermore, the time-points at which the current detection timing may or may not correspond with the period of PWM carrier. For example, the current detection may be carried out by the use of a period twice or four times larger than the carrier period. Accordingly, the current detection timing signal to be supplied to the current detector 7 may not be a carrier but may be a pulse signal having a predetermined period in synchronization with the carrier, for example.

The shunt resistor 4 may be disposed on the positive bus bar 2*a*. Furthermore, the current detector should not be limited to the shunt resistor 4 but may be a current transformer or the like.

The switching element should not be limited to the N channel MOSFET but may be a P channel MOSFET, an IGBT, a power transistor or the like.

The increase or decrease value of the duty should not be limited to about a quarter of the pre-change duty but may arbitrarily be changed according to various designs.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A motor control device comprising:

a current detecting element connected to a direct current side of an inverter circuit driving an electric motor and configured to generate a signal corresponding to a current value;

a PWM signal generation unit which is configured to determine a rotor position based on phase currents of the motor and to generate a three-phase PWM signal pattern so that the pattern follows the rotor position;

a current detection unit which is configured to detect the phase currents based on a signal generated by the current detecting element and the PWM signal pattern; and a duty compensation unit which is configured to compensate for a duty of the PWM signal pattern, wherein:

the PWM signal generation unit is configured to increase/decrease the duty in both leading and lagging directions based on any phase of a carrier period regarding a phase in which duty becomes maximum among three-phase PWM signals;

the PWM signal generation unit is configured to increase/decrease the duty in one of the leading and lagging directions based on any phase of the carrier period regarding a phase in which duty becomes minimum among three-phase PWM signals;

regarding a phase in which duty is intermediate between said two phases, the PWM signal generation unit is configured to increase/decrease duty in the other of the leading and lagging directions based on said any phase, thereby generating a three-phase PWM signal pattern so that the current detection unit is capable of detecting two-phase currents at two time-points fixed within the carrier period of the PWM signal; and the duty compensation unit is configured to increase/decrease, before and after changing an increasing/decreasing direction of three-phase duties, the duties thereby to compensate for the duties.

2. The motor control device according to claim 1, wherein the duty compensation unit has an object to be compensated for and the object includes a phase in which the increasing/decreasing direction of the duties is switched from the both directions to the leading or lagging direction and another phase in which the increasing/decreasing direction of the duties is switched from the leading or lagging direction to the both directions.

3. The motor control device according to claim 2, wherein the duty compensation unit is configured to decrease the duty after change of the increasing/decreasing direction regarding the phase in which on-timing of the duty pulse after change of the increasing/decreasing direction comes nearer to off-timing of the duty pulse, and the duty compensation unit is also configured to increase the duty before change of the increasing/decreasing direction regarding the phase in which on-timing recedes off-timing.

* * * * *